Jan. 2, 1968  B. P. FOXLEY-CONOLLY  3,361,119
INTERNAL COMBUSTION ENGINE

Filed Sept. 24, 1965  3 Sheets-Sheet 1

INVENTOR
*Brian Patrick Foxley-Conolly*
BY *Stevens, Davis, Miller & Mosher*
ATTORNEYS

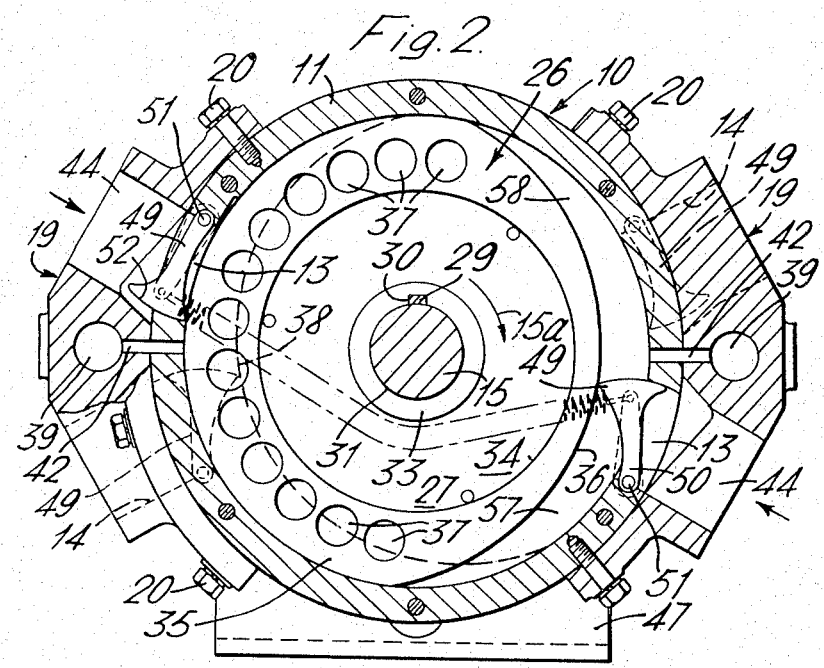

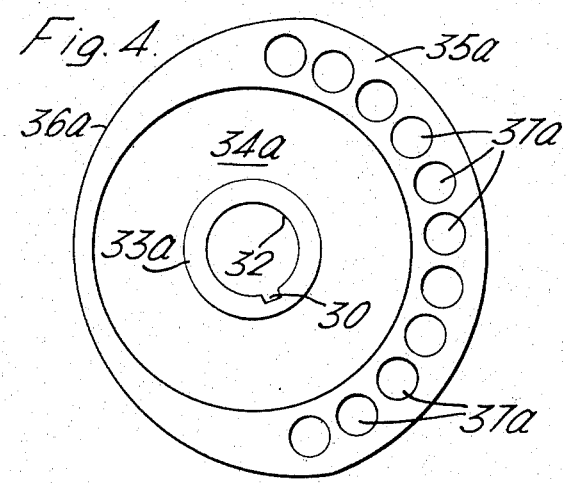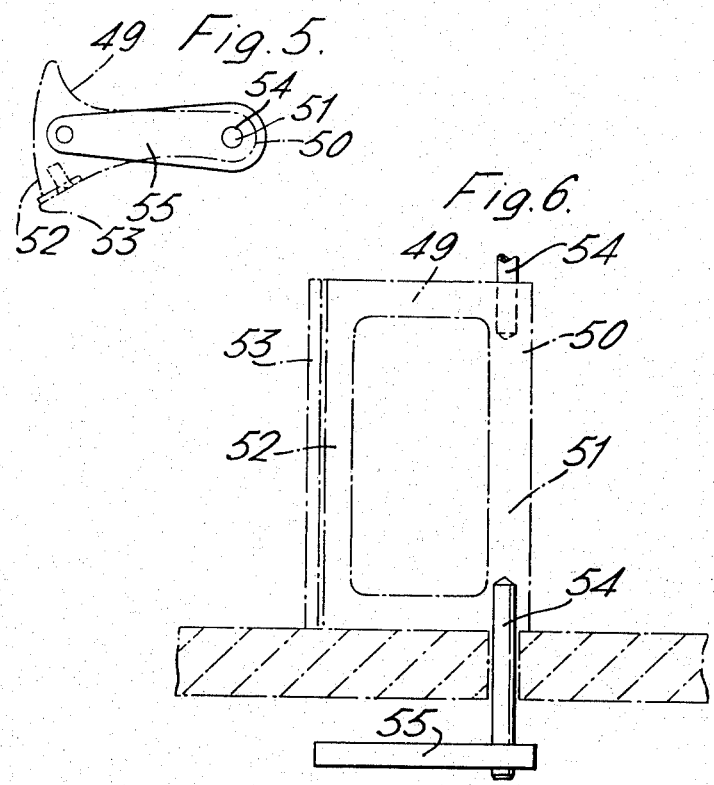

United States Patent Office 3,361,119
Patented Jan. 2, 1968

3,361,119
INTERNAL COMBUSTION ENGINE
Brian Patrick Foxley-Conolly, 19 Brolga St., Slade Point, via Mackay, Queensland, Australia
Filed Sept. 24, 1965, Ser. No. 489,842
Claims priority, application Australia, Sept. 28, 1964, 49,844/64
11 Claims. (Cl. 123—8)

ABSTRACT OF THE DISCLOSURE

A rotary engine having two rotor parts each rotating in a cylindrical casing chamber and having a cam surface, one rotor part drawing in fuel gas and compressing it into a combustion chamber which drives the other part on firing, swinging abutments engaging the two rotor parts at all times, the combustion chamber being external of the casing chambers and provided with gas passages leading through the cylindrical casing walls, each rotor part also having a sealing surface at least as long as its cam surface.

---

This invention relates to internal combustion engines.

Such engines of various types have followed more or less standard lines for many years, and it has become conventional to use a main rotatable power-transmitting shaft which by its nature is termed a "crank-shaft," this shaft being rotated through crank and connecting rod means by pistons which are axially reciprocable in cylindrical chambers which are appropriately termed "cylinders." The latter receive the explosive mixture of air and fuel from a carburetor, the mixture then being fired by a spark plug to cause the respective piston to be urged on its working stroke. While this principle has proved generally efficient, it has been considered that engines should not require to be restricted to such elaborate piston-and-cylinder constructions, and various attempts have been made over the years to produce rotary type engines which will lead to greater simplicity and have many other advantages over current constructions.

My present invention has been devised with the principal object of providing a novel, rotary-type internal combustion engine which will be of simple and inexpensive construction, which will give both efficiency and economy, and which will have other advantages over the piston-type engines as presently known.

With the foregoing and other objects in view, my invention resides broadly in an internal combustion engine including a power-transmitting rotor arranged for rotation in a casing, the rotor having at least two circumferential grooves each extending partly around its periphery and spaced from one another, said grooves constituting an induction groove and an exhaust groove respectively, an inlet to the casing to communicate with the induction groove, an outlet from the casing to communicate with the exhaust groove, an induction cam follower on the casing to engage in urged manner in the induction groove, an exhaust cam follower on the casing to engage in urged manner in the exhaust groove, and a combustion chamber on or adjacent the casing to receive compressed fuel from the induction groove and to cause same to expand into the exhaust groove on the firing action, the inlet being ahead of the induction cam follower relative to the direction of rotation of the rotor and the outlet being behind the exhaust cam follower, whereby upon rotation of the rotor, the leading end of the induction groove increases in volume so that fuel gas is drawn therein through the inlet for subsequent compression, fuel gas previously received in the induction groove is compressed in the trailing end of the induction groove and thus in the combustion chamber, the leading end of the exhaust groove receives the expanding gas from the combustion chamber and so increases in volume to provide a driving impulse for the rotor, and the trailing end of the exhaust groove thus decreases in volume to force through the outlet spent gases previously received in the exhaust groove.

Preferably, the rotor has the induction groove and exhaust groove at diametrically-opposed and axially-spaced positions, each groove suitably extending through about half a circle. In one embodiment, I provide two combustion chambers arranged to receive compressed fuel gas at diametrically-opposed positions on the casing, two inlets being provided for the induction groove at diametrically-opposed positions on the casing, and two outlets being provided in similar manner for the exhaust groove, while two diametrically-opposed cam followers are provided for each groove. In this embodiment, fuel gas drawn in through one inlet by the action of one cam follower is caused to be compressed and transferred by the action of the second cam follower which simultaneously causes fuel gas to be drawn in through the second inlet for compression by the action of the first cam follower upon further rotation of the rotor. However, it should be noted that there may be more than two combustion chambers around the casing, and there could be a series of axially spaced induction and exhaust grooves, arranged to co-operate in pairs. Other features of the invention will become apparent from the following description.

In order that the invention may be more readily understood and put into practical effect, reference will now be made to the accompanying drawings, wherein:

FIG. 2 is a sectional end view of the apparatus, taken on the line 2—2 of FIG. 1;

FIG. 3 is a side elevational view of the apparatus shown in FIGS. 1 and 2;

FIG. 4 is an end view of the exhaust rotor member, taken on the line 4—4 of FIG. 1;

FIG. 5 is an end view of one of the cam followers of the apparatus; and

FIG. 6 is a plan view of the cam follower shown in FIG. 5.

Figure 1:
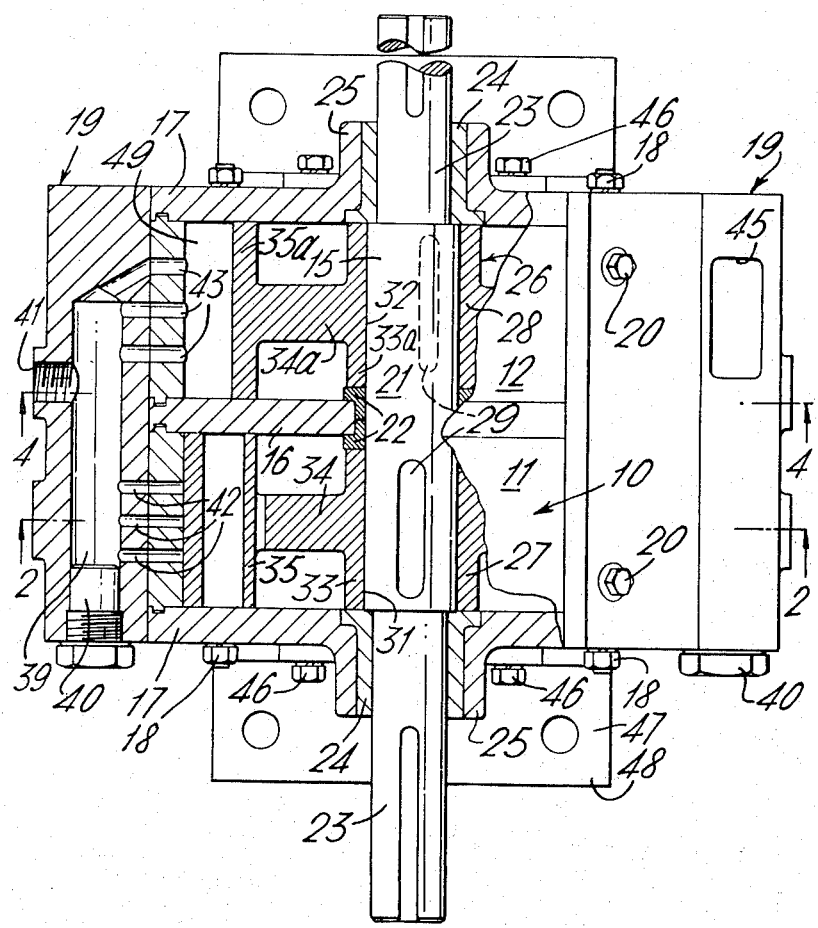
FIG. 1 is a plan view, partly in section, of the casing, rotor assembly and associated components for one form of internal combustion engine according to my invention.

The apparatus shown in the drawings includes a casing 10 having an induction casing portion 11 at one end and an exhaust casing portion 12 at the other end, the two portions being of similar tubular construction except that each has a pair of square openings at diametrically-opposed positions. The two openings 13 of the induction casing portion 11 are shown fully in FIG. 2 and constitute fuel gas inlets, while the two openings 14 of the exhaust casing portion 12 are shown in dotted lines in FIG. 2 and constitute exhaust outlets.

The two casing portions 11 and 12 are mounted co-axially so that a shaft 15 can be rotatable therein on the axis, the direction of rotation being indicated by the arrow 15a in FIG. 2. The casing portions 11 and 12 define axially-spaced cylindrical chambers which are divided by a common dividing wall 16, while their outer ends are closed by end plates 17. It will be seen from the drawings that the casing portions 11 and 12 are secured to the respective end plates 17 by studs and nuts 18, while the portions 11 and 12 have the dividing wall 16 secured between them by the provision of combustion chamber assemblies 19 at each side connected to both casing portions by screws 20. The shaft 15 has a middle section 21 of uniform diameter disposed between the end plates 17 and passing rotatably through bushes 22 in a central aperture of the dividing wall 16, while end portions 23 of the shaft 15 are of lesser diameter and are rotatable in bushes 24 mounted within central bosses 25 of the end plates 17, whereby the extremities of the shaft 15 are outside the casing 10 and can be utilised for taking power from the rotating shaft.

Secured to the shaft 15 is a rotor assembly 26 having an induction rotor portion 27 within the induction casing portion 11 and an exhaust rotor portion 28 within the exhaust casing portion 12, attachment being made between keys 29 on the shaft 15 and keyways 30 in the bores 31 and 32 of the two rotor portions 27 and 28. Considering firstly the induction rotor portion 27, this has a central boss 33 joined by an integral annular web 34 to an outer annular rim 35 of such width as to extend fully across the casing portion 11 in the axial direction. The rim 35 is of constant external diameter over more than half a circle to engage closely inside the casing portion 11, but it is cut back over the remainder of its periphery to provide an induction cam surface 36 which increases steadily in diameter from the middle position to each end. Axial openings 37 are provided through the rim 35 in the portion thereof which is not cut back, so that balancing of the rotor portion 27 about its axis of rotation is achieved.

The exhaust rotor portion 28 is of similar construction to the portion 27 and has a boss 33a, web 34a, rim 35a, exhaust cam surface 36a and balancing openings 37a, but in this case the surface 36a extends for slightly more than half a circle, this being found to be a desirable design. The relative attitudes of the two rotor portions will be apparent from FIG. 2 in which the exhaust surface 36a is shown by the dotted line 38.

The two combustion chamber assemblies 19 are secured to the casing 10 as described, and each has therein a combustion chamber 39 formed as a bore from one end of the assembly 19, the chamber being closed by a screw-type plug 40. Each combustion chamber 39 has a tapped aperture 41 for mounting a spark plug (not shown) small passages 42 leading from one end of the chamber 39 to within the induction casing portion 11, while similar passages 43 lead from the other end of the chamber 39 to within the exhaust casing portion 12. The combustion chamber assemblies 19 also act as mountings for the inlet and outlet fittings (not shown), each assembly 19 having an inlet opening 44 to register with the respective opening 13, and an outlet opening 45 to register with the respective opening 14. In the drawing, the assembly 19 at the right-hand side has a lower inlet opening 44 for the induction casing portion 11 and a higher outlet opening 45 for the exhaust casing portion, while the assembly 19 at the left-hand side has a higher inlet opening 44 for induction and a lower outlet opening 45 for exhaust purposes.

For mounting purposes, the casing 10 has its end plates 17 secured by bolts 46 to upright webs of angle-iron brackets 47, of which the lower horizontal webs 48 may be bolted or otherwise secured to any flat surface.

In each of the four openings 44 and 45, there is a movable abutment or cam follower 49 having an inner portion 50 at which it is pivoted about an axis 51 and an outer portion 52 adapted to enter the respective casing portion 11 or 12 and engage the respective induction cam surface 36 or 36a of the rotor portions 27 or 28. The actual engagement is made by a blade 53 secured by screws to the inner edge of the portion 52, and it should be noted that the cam followers 49 are arranged so that such blades 53 are subject to pressure in the casing tending to urge them against the rotor portions. Each cam follower 49 extends across the respective opening 44 or 45 and is made hollow, as illustrated, so that flow through the opening is not prevented. On the pivot axis of each cam follower 49, there is a pivot stem 54 at each end, the stem at one end being extended through the end plate 17 and provided with a lever arm 55 parallel to the general plane of the cam follower.

Thus, at one end of the casing 10, there are two stems 54 and lever arms 55 to control the cam followers for the induction casing portion 11, and the outer ends of the lever arms 55 are connected by a tension spring 56 so that the cam followers 49 have their blades 53 held in towards the induction rotor portion 27, while the same arrangement is provided at the other end of the casing 11 to urge the cam followers in towards the exhaust rotor portion 28.

In operation, and considering FIG. 2 in particular, it will be seen that the induction space between the chamber wall and cam surface 36 is divided by the cam follower 49 into a leading end 57 and a trailing end 58 relative to the direction of rotation indicated by the arrow 15a, and as rotation takes place, the leading end 57 will draw in fuel gas through the inlet 44 by suction as it increases in volume, and the trailing end 58 will decrease in volume to compress the fuel gas previously received through the opposite inlet 44, the compressed gas passing through the apertures 42 into the combustion chamber 39 where the fuel gas is stored and further compressed until the induction space at surface 36 is emptied, no gas being able to escape through the apertures 43 because the exhaust casing portion 12 has the ungrooved part of the exhaust rotor portion 28 adjacent the apertures 43. However, when the trailing end of the induction space at surface 36 has been emptied into the combustion chamber 39, the leading end of the exhaust space at exhaust cam surface 36a will have reached the cam follower 49 which enters that space, and the spark plug is arranged to fire so that expanding gas enters the leading end of the exhaust space at surface 36a through the apertures 43. In consequence, the expanding gas pushes within the leading and of the exhaust space at surface 36a and against the cam follower therein, so that the gas can only be accommodated by rotation of the rotor assembly to increase the volume of the leading end of the exhaust space at surface 36a, such action providing the driving impulse for the rotor. In practice, the two spaces at surfaces 36 and 36a are so arranged that the combustion chamber will be scoured by compressing gases passing through it and out through an exhaust opening for a very short period just prior to compression commencing.

Thus, at each combustion chamber 39, there is an inlet and an outlet, with a cam follower in each of these, and because the compressing and expanding forces are in opposite directions, the two cam followers must be oppositely arranged, as illustrated, the blade in each case being subject to pressure to maintain it against the respective rotor portion. With the arrangement illustrated, the induction space at surface 36 receives fuel gas at one inlet and has the gas compressed just before the next inlet. The same applies to the exhaust space at surface 36a which exhausts at each outlet the spent gas received at the preceding combustion chamber. Thus, the spark plugs are arranged to fire alternately at equal intervals.

It will of course be understood that the described and illustrated embodiment may be subject to many modifications, and any desired number of combustion chambers may be employed with appropriate variations in the number of the other components. Each rotor portion could have two or more travelling spaces around its periphery, with an appropriate number of combustion chambers, and the rotor could have any number of axially spaced sections with induction and exhaust portions successively. The invention is to be understood to embrace all modifications within its scope and ambit, as defined by the appended claims.

What I claim is:
1. In a rotary internal combustion engine having:
   a rotor arranged for rotation in a casing, said rotor including axially spaced induction and exhaust end portions;
   said casing including first and second cylindrical casing chambers coaxial with one another about the axis of said rotor and containing respectively the induction and exhaust end portions of said rotor;
   said casing further including dividing wall means dividing said first and second casing chambers from one another, said rotor extending sealably and ro- tatably through a central aperture of the dividing wall means;

the induction end portion of said rotor having an induction cam surface around part of its periphery, the ends of said induction cam surface being closely adjacent the cylindrical inner surface of said first casing chamber, while the remainder of said induction cam surface is positioned at lesser distances from the axis of said rotor to define a travelling induction space between said induction cam surface and the cylindrical surface of said first chamber;

the exhaust end portion of said rotor having an exhaust cam surface around part of its periphery, the ends of said exhaust cam surface being closely adjacent the cylindrical inner surface of said second casing chamber, while the remainder of said exhaust cam surface is at lesser distances from the axis of said rotor to define a travelling exhaust space between said exhaust cam surface and the cylindrical surface of said second chamber;

an inlet provided to the casing through said first chamber wall and the cylindrical inner surface thereof to communicate with the travelling induction space;

an outlet provided in the casing through the second chamber wall and the cylindrical inner surface to communicate with the traveling exhaust space;

a first movable abutment or cam follower provided on the casing to extend into said first casing chamber past the cylindrical inner surface thereof to engage against the induction end portion of said rotor and the induction cam surface thereof;

a second movable abutment or cam follower provided on the casing to extend into the second casing chamber past the cylindrical inner surface thereof to engage against the exhaust end portion of said rotor and the exhaust cam surface thereof;

a combustion chamber provided on the casing to receive compressed fuel gas from the travelling induction space and to cause the gas to expand into the travelling exhaust space on a firing action, the inlet being ahead of the induction cam follower relative to the direction of rotation of the rotor and the outlet being behind the exhaust cam follower, whereby upon rotation of the rotor, the leading end of the travelling induction space increases in volume so that fuel gas is drawn therein through the inlet for subsequent compression, fuel gas previously received in the trailing induction space is compressed in the travelling end of the induction space and thus in the combustion chamber, the leading end of the exhaust space receives the expanding gas from the combustion chamber and so increases in volume to provide a driving impulse for the rotor, and the trailing end of the exhaust space thus decreases in volume to force through the outlet spent gases previously received in the exhaust space;

the improvement comprising:

said combustion chamber being disposed on the casing at a distance from the rotor axis greater than the radius of the cylindrical inner surface of either casing member;

gas passages through the casing from the inner cylindrical surfaces of the casing members providing communication between the combustion chamber and the casing members, the dividing wall means being imperforate except for the central aperture through which the rotor extends sealably and rotatably;

the induction end portion of said rotor having a part-cylindrical surface concentric with and closely accommodated in said first casing chamber, said part-cylindrical surface subtending an angle at the rotor axis substantially equal to or greater than the angle subtended by the induction cam surface and adapted to seal said gas passages from said first casing chamber to said combustion chamber when passing said passages upon rotation of said rotor, and the exhaust end portion of said rotor having a part-cylindrical surface concentric with and closely accommodated in a second casing member, said part-cylindrical surface of the exhaust end portion of said rotor subtending an angle at the rotor axis substantially equal to or greater than the angle subtended by the exhaust cam surface and being adapted to seal said gas passages from said second casing chamber to said combustion chamber while passing said passages upon rotation of said rotor.

2. A rotary internal combustion engine according to claim 1, wherein the travelling induction space and travelling exhaust space have their greatest depth midway along their lengths and have progressively lesser depth towards each end.

3. A rotary internal combustion engine according to claim 1, wherein said travelling induction space and said travelling exhaust space both extend circumferentially about the rotor through substantially half a circle.

4. A rotary internal combustion engine according to claim 1, wherein the rotor end portions are secured to a shaft at an intermediate position thereon, said shaft being journalled in end bearings in said casing, at least one end of said shaft extending outside the casing whereby power may be taken from said shaft.

5. A rotary internal combustion engine according to claim 1, wherein said combustion chamber is provided in a combustion chamber assembly secured to said housing, said assembly having openings therein to register with said inlet and outlet respectively.

6. A rotary internal combustion engine according to claim 1, wherein each cam follower is mounted pivotally to engage its respective rotor end portion, and spring-loading is provided to urge said cam followers against their respective rotor end portions.

7. A rotary internal combustion engine according to claim 6, wherein said induction cam follower is mounted in the inlet and acts to seal the inlet from the trailing end of the induction space while permitting inflow of fuel gas to the leading end of the induction space.

8. A rotary internal combustion engine according to claim 6, wherein the exhaust cam follower is mounted in the outlet and acts to seal the outlet from the leading end of the exhaust space while permitting outflow of spent gases from the trailing end of the exhaust space.

9. A rotary internal combustion engine according to claim 6, wherein each cam follower has a contact blade for engagement with a respective rotor end portion, the blade of the induction cam follower being subjected to gas-compression forces to maintain it against the rotor, and the blade of the exhaust cam follower being subjected to gas-expansion forces to maintain it against the rotor.

10. A rotary internal combustion engine according to claim 1, wherein the combustion chamber constitutes a first combustion chamber, there being provided one or more further combustion chambers arranged for sequential firing actions, each having associated with it an induction cam follower, an exhaust cam follower, an inlet and an outlet.

11. A rotary internal combustion engine according to claim 1, wherein:

said combustion chamber is one of two combustion chambers arranged to receive compressed fuel gas at diametrically-opposed positions on the casing and to fire successively at equal intervals;

said inlet is one of two inlets provided in the induction space at diametrically-opposed positions on the casing;

said outlet is one of two outlets provided for the exhaust space at diametrically-opposed positions on the casing;

said induction cam follower is one of two diametrically-opposed induction cam followers for the induction space, and said exhaust cam follower is one of two diametrically-opposed exhaust cam followers for the exhaust space, whereby the fuel gas drawn in through one inlet by the action of one induction cam follower is caused to be compressed and transferred by the action of the second induction cam follower which simultaneously causes fuel gas to be drawn in through the second inlet for compression by the action of the first induction cam follower upon further rotation of the rotor.

References Cited
UNITED STATES PATENTS

| | | | |
|---|---|---|---|
| 1,015,663 | 1/1912 | Bonsteel | 123—15 |
| 2,511,441 | 6/1950 | Loubiere. | |
| 2,583,633 | 1/1952 | Cronin. | |

MARK M. NEWMAN, *Primary Examiner.*

RALPH D. BLAKESLEE, *Examiner.*